United States Patent [19]

Case et al.

[11] Patent Number: 4,773,839
[45] Date of Patent: Sep. 27, 1988

[54] QUICK-CHANGE THERMOFORMER

[75] Inventors: Charles B. Case, Eau Claire; Robert J. Cyr, Chippewa Falls, both of

[73] Assignee: Amoco Corporation, Chicago, Ill.

[21] Appl. No.: 11,044

[22] Filed: Feb. 5, 1987

[51] Int. Cl.$^4$ ............................................. B29C 51/20
[52] U.S. Cl. .................................... 425/186; 100/214; 100/295; 100/918; 264/322; 269/99; 269/289 R; 425/193; 425/383; 425/411; 425/451.9
[58] Field of Search .................. 425/192 R, 193, 195, 425/406, 411, 452, 450.1, 186, 190, 451.9, 575, DIG. 221; 100/918, 214, 219, 295; 269/58, 73, 99, 100, 289 R, 900, 309; 72/461, 462, 467; 76/107 R; 264/322

[56] References Cited
U.S. PATENT DOCUMENTS 3,111,895 11/1963 Kraft et al. ........................... 100/918
4,468,019 8/1984 Staudenmaier ........................ 269/99

Primary Examiner—Jay H. Woo
Assistant Examiner—C. Scott Bushey
Attorney, Agent, or Firm—Maria Parrish Tungol; William H. Magidson; Ralph C. Medhurst

[57] ABSTRACT

An apparatus is disclosed which facilitates rapid insertion, removal and exchange of a fixture in situations where it must be securely attached to a support surface before or after removal from such surface. The fixture has a plurality of studs extending outwardly therefrom which guide the fixture tool through channels in a support surface and into placement in respective slots of T-slot clamps which are moved by fluid pressure to the open position, the fixture transferred, and the fluid pressure released to effect clamping. The present invention can be used in a high production manufacturing system such as a press or molding operation and is particularly useful in thermoforming operations.

11 Claims, 4 Drawing Sheets

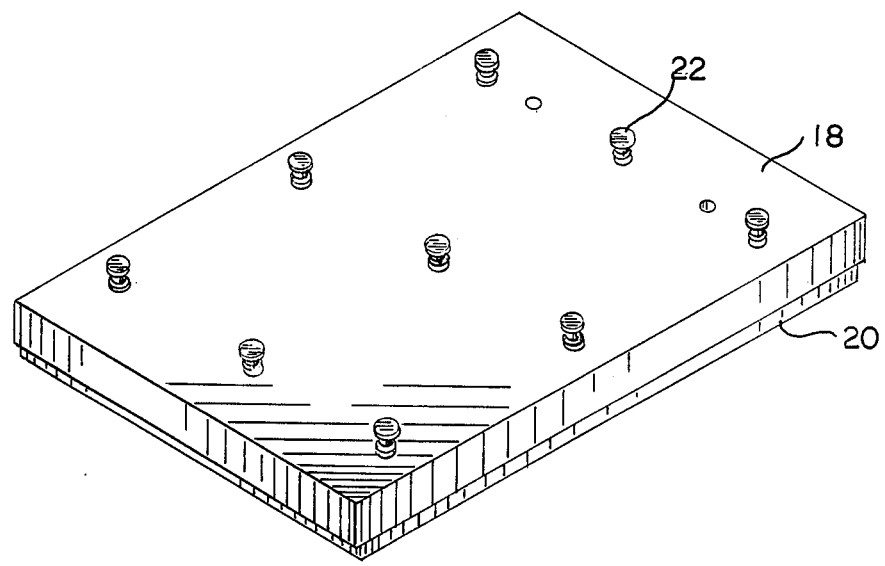
Fig-3-
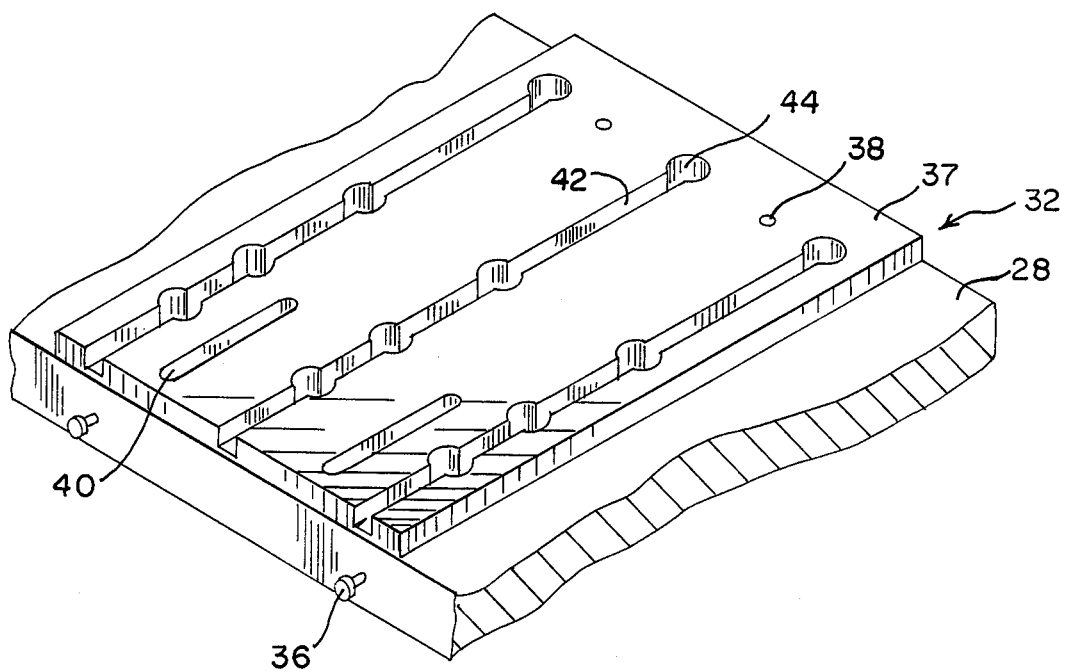
Fig-4-

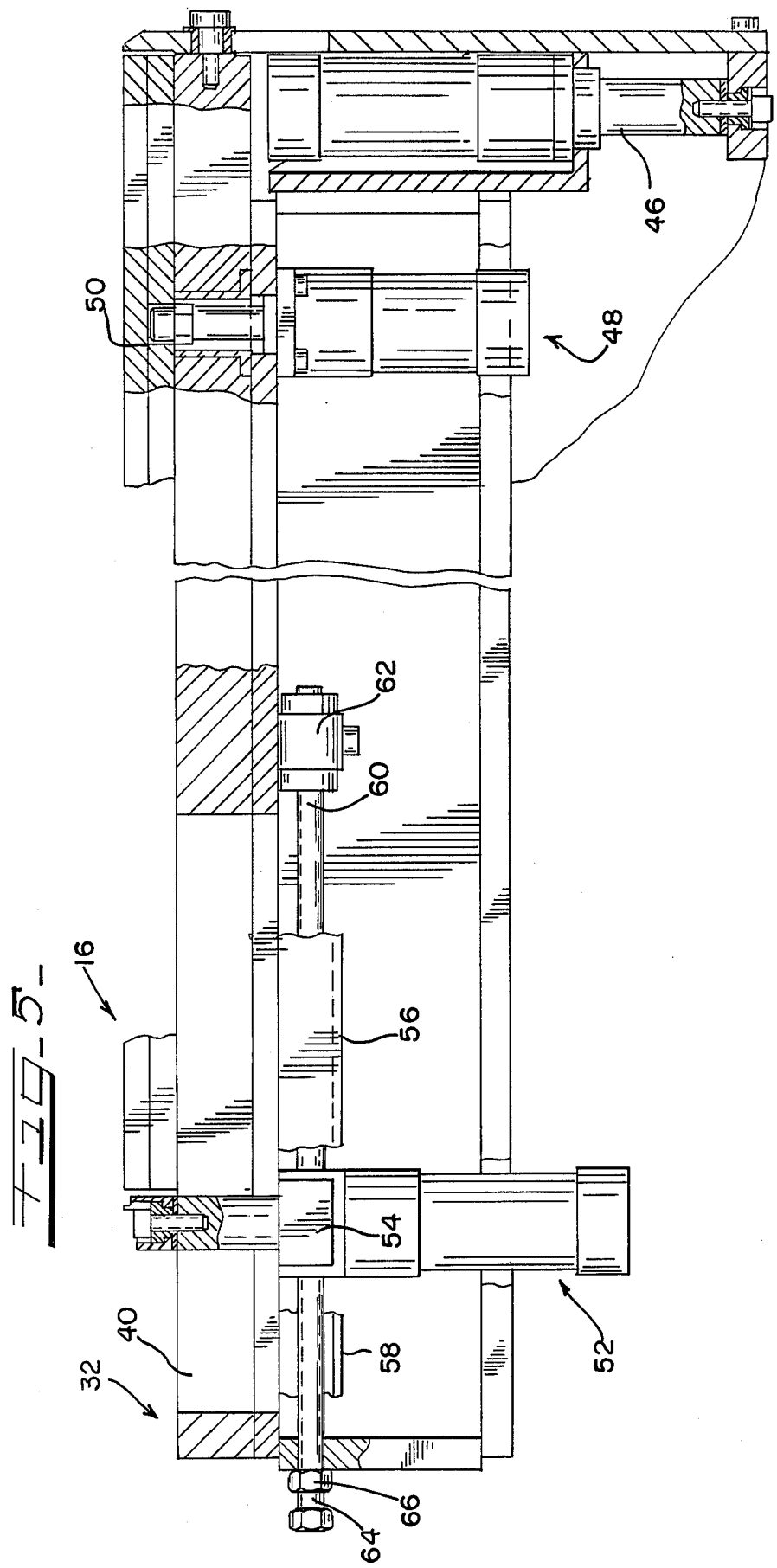

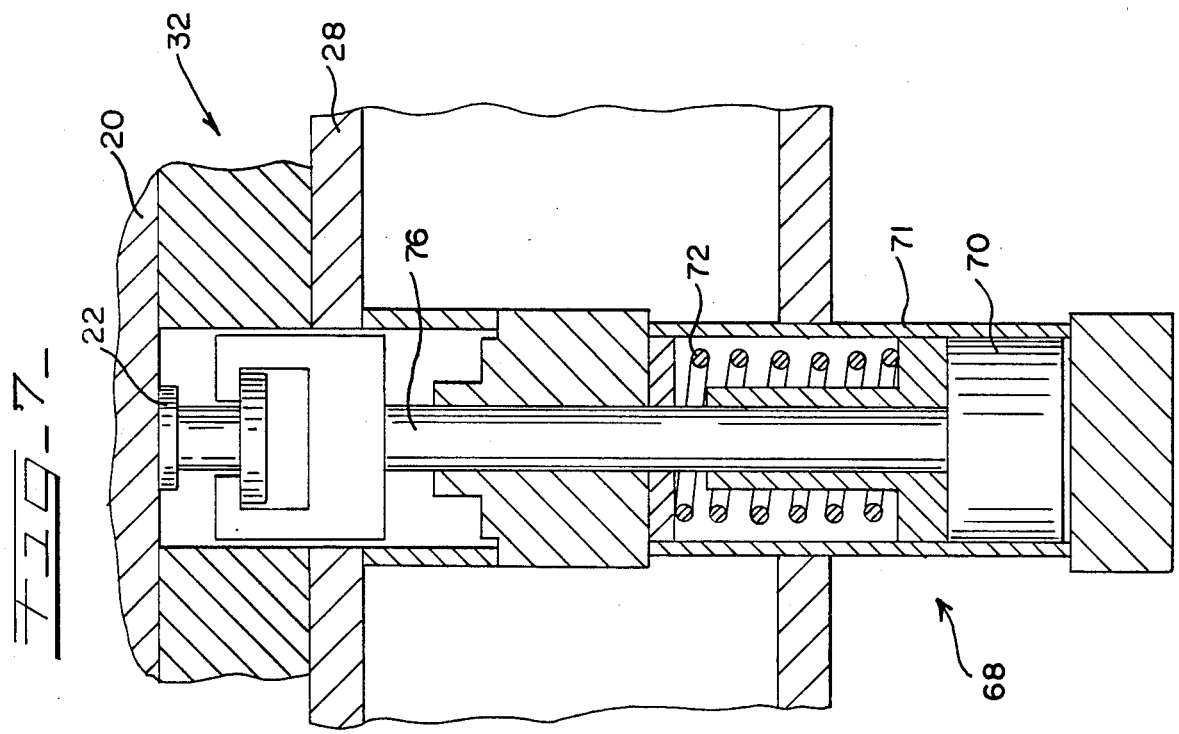
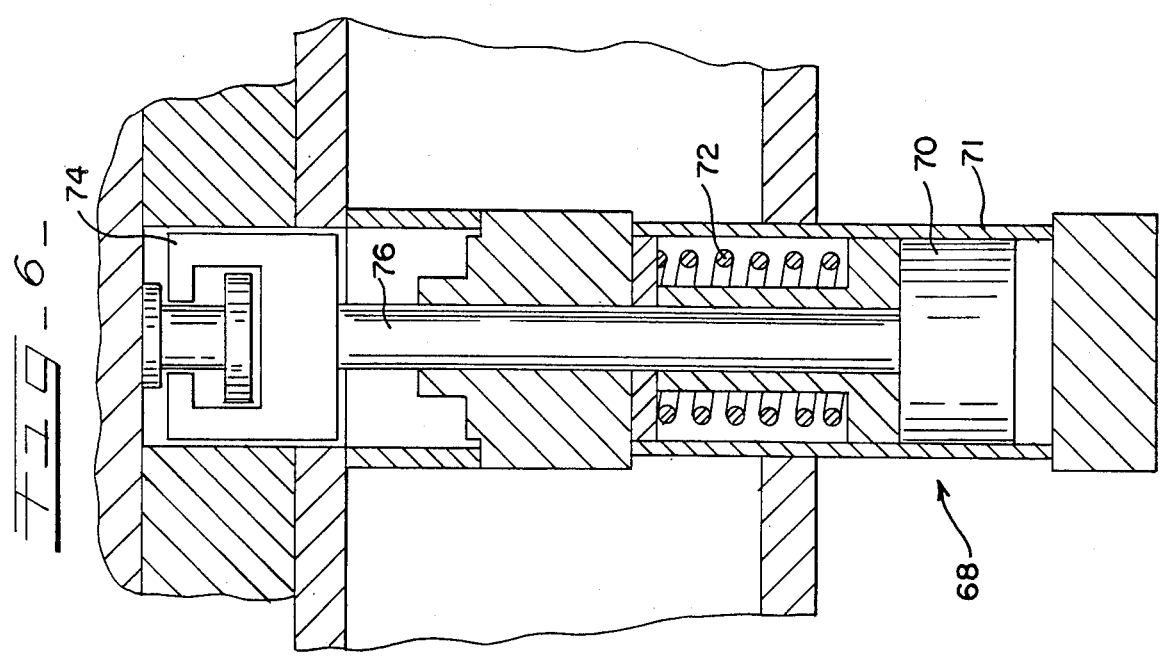

QUICK-CHANGE THERMOFORMER

TECHNICAL FIELD

The present invention relates to an improved and novel fixture or tool quick-change means and more particularly to guide and clamp means of the type, to facilitate mold exchange in a thermoformer.

BACKGROUND OF THE INVENTION

To be cost efficient in a high production system, such as in stamping, molding, machining, and the like, it is requisite that tool or fixture exchange time be minimal so as to hold to a minimum, or eliminate, the system's down-time. This is especially true in a molding system where the physical and chemical state of the materials worked on present additional down-time problems.

Operations involving the movement of fixtures of substantial size and/or weight are typically cumbersome and time-consuming, especially when the fixtures must be secured to a work surface after placement or repositioning thereon. Exact positioning of the fixture is often critical in achieving the desired results from the fixture and can be difficult to achieve with sizable, heavy fixtures. Further, the removal of such sizable fixtures involves laborious, time-consuming efforts to unsecure and remove the fixture from the work surface. The effort required to move such fixtures results in reduction of the rate of operations, increased labor expenses, and decreased flexibility in scheduling operations requiring different fixtures.

In the field of molding, e.g., injection molding and thermoforming, various sizes of molds are used to produce different products. The commercially used molds are typically quite heavy and cumbersome to move. The mount plates used to trim the products resulting from the thermoforming differ for each product and likewise are often of substantial size and/or weight. Most commercial operations routinely involve the production of a variety of molded products to meet customer requests. The amount of the product varies and the molds are changed according to the amount required of a particular product. The diversification of products as well as varying customer requests often requires frequent change of the molds or dies used in molding and associated operations. Further, the molds or dies must often be inspected and repaired or replaced. The removal and insertion of the molds or dies has typically involved laborious and time-consuming manipulation of various service fittings and the realignment of the mold or die to resume operations. In any high production operation, the down-time accompanying the change of molds or dies and the associated labor costs must be minimized to maintain the desired productivity. Therefore, a system which contains means for the quick change of a fixture such as a mold or a die in which the fixture can be quickly and securely fastened or released from a work surface is desirable.

Prior attempts to effect such quick change involve modification of guides for transfer, centering means and quick-lock and release clamps; see for instance each of the U.S. Pat. Nos.:

2,940,384 June 16, 1960 Manschuer et al.
4,058,885 Nov. 22, 1977 Raymond A. Bergman
4,354,796 Oct. 19, 1982 Raymond A. Bergman
4,472,127 Sept. 18, 1984 Cyriax et al.
4,555,228 Nov. 26, 1985 Nishiike et al.

It is an object of the invention to provide fixture or tool quick-change means having clamping means of a quick-release/lock type that uniquely associate with guide slots through which studs affixed to a fixture or tool translate.

It is another object of the invention to provide novel clamping means of a quick-release/lock type that uniquely associate with guide slots through which fixture or tool clamp studs translate.

It is a further object of the invention to provide an improved downstream clamp bar that is adjustably mounted for translation in slots of a platen and cooling plate to accommodate mold size.

Yet another object of the invention is to provide improved means for facilitating fixture or tool exchange which are relatively inexpensive to manufacture and uncomplicated with regard to assembly and use.

SUMMARY OF THE INVENTION

The present invention is directed to novel and improved operatively associated guide, centering, and clamp means adapted to facilitate rapid insertion, removal and exchange of a fixture or tool in situations where said tool or fixture must be securely attached to a support surface during operations involving said fixture or tool. A fixture or tool at a work station has a plurality of studs extending outwardly therefrom. The studs guide the tool through channels in a support surface and into placement in respective slots of T-slot clamps. The clamps normally extend into the channel in a mechanically biased clamping position. To accommodate the studs, the clamps are moved by fluid pressure to the open position, the tool transferred, and the fluid pressure released to effect tool clamping. Fluid-actuated, downstream clamping bar means extend through slots in the support surface and are reciprocally supported on housings that are mounted for sliding movement on fixed rails that are parallel to the slots. Means disposed externally of the support surface, connected to the housings, are manipulable to effect said housing movements for downstream clamp bar adjustment.

The present invention can be used in high production manufacturing systems such as a press or molding operation and is particularly useful in systems such as thermoforming operations.

For a more fully developed presentation of the invention, and a preferred embodiment thereof, reference is made to the following descriptive matter, attached drawings and claims.

BRIEF DESCRIPTION OF THE DRAWINGS

FIG. 3 is a perspective view of the mold and clamping studs extending therefrom.

FIG. 4 is a perspective view, partly in section, of the lower platen and cooling plate and discloses therein guide and clamp-stud accommodating channels, holes to accommodate a centering or locator tool and slots to accommodate the down-stream clamp bar.

FIG. 5 is an elevational side view, partly in section, of the assembled lower platen, cooling plate and mold-half and discloses therein (1) at the right side of the drawing a conventional oven end clamp bar, (2) at the intermediate drawing section a pneumatic mold centering or locator tool and (3) at the drawing left side an adjustable mounting for a downstream clamp bar.

FIGS. 6 and 7 disclose a hydraulically operated clamp, in respective open and closed operative association with a clamp-stud of the lower mold half.

DETAILED DESCRIPTION OF THE INVENTION

Figure 1:
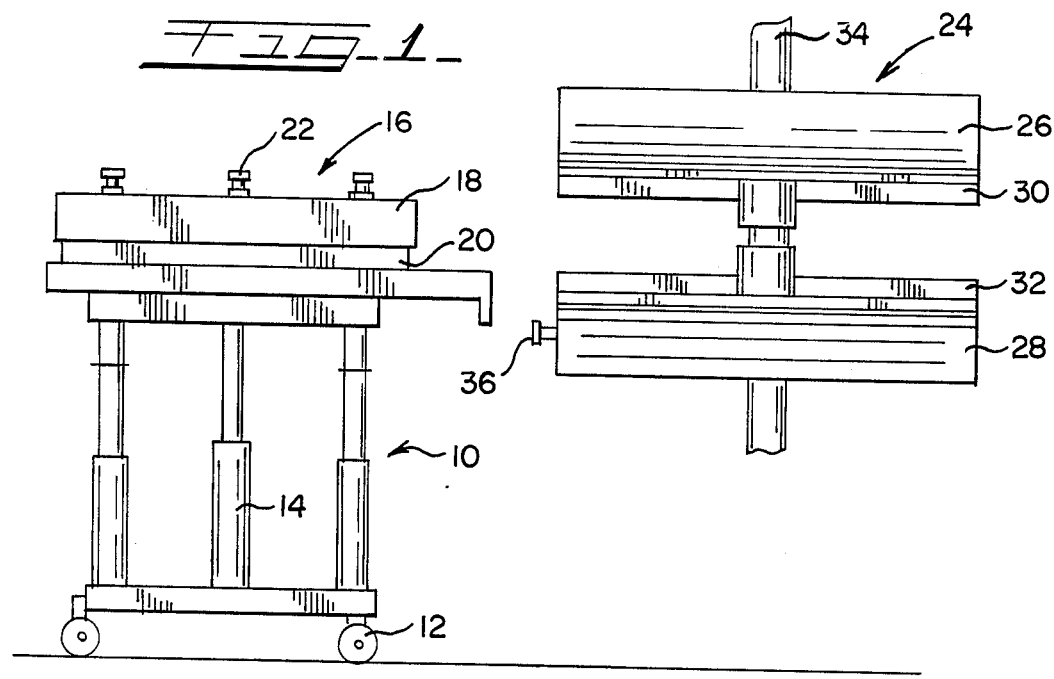
FIG. 1 is an elevational side view of a split mold on a movable lift table and associated cooling plates and platens.
Figure 2:
FIG. 2 is a front elevational view of the assembled platens, cooling plates and mold.
Figure 2:
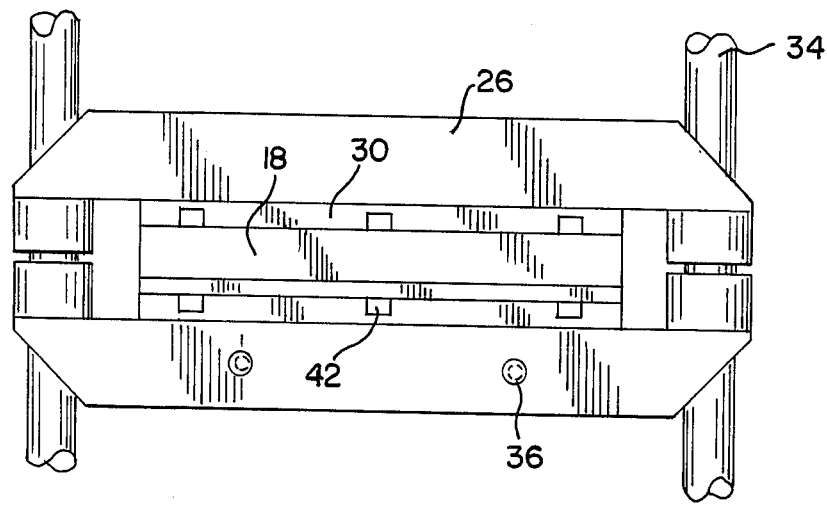

The embodiment shown and described is only illustrative of the present invention and is not to be construed as being delimitive thereof; since once being apprised of the invention, changes in structure would be readily apparent to one skilled in the art. Referring to the drawings which show a preferred embodiment of the invention, and wherein like numerals indicate like structure, FIG. 1 shows a lift table 10 that is movable on casters 12 and is vertically adjustable through cylinder means 14. The table supports a split mold 16 comprised of upper and lower halves, 18 and 20 respectively. Tool clamp studs 22 extend outwardly from each mold half's rear surface; only the upper studs being illustrated and more clearly shown in FIG. 3.

Parts of the table not illustrated are a roller top and side rails to facilitate mold movement and location, and means referencing the table and mold to a thermoforming station that is illustrated in FIG. 1 by the platen assembly 24 and means to transfer the mold. The station is but one of many in a highly automated system that provides for material feed therethrough. The present invention can be used in conventional thermoforming systems such as those with cut-sheet thermoformers and continuous web thermoformers which are used in high-volume applications. The present invention can be used in a highly automated system which also includes a trim press station that has a uniquely novel tool clamp means that is the subject of applicant's co-pending application, Ser. No. 07/011,045 entitled "QUICK-CHANGE TRIM PRESS", filed on instant date herewith and the disclosure of which is incorporated herein by reference.

The lift table per se, which can be part of the automated system, is not an essential part of the invention. Other convenient means for transporting the fixture or tool to and from the work station can be used. Such means can be separate from the work station or attached thereto in a manner similar to that disclosed in U.S. Pat. Nos. 2,940,384; 4,555,228; and 4,472,127, all herein incorporated by reference.

The thermoforming station, as shown in FIG. 1, has upper and lower platens 26, 28 associated with cooling plates 30, 32 respectively. At least one platen is reciprocable on guide rods 34 and the lower platen has a pair of lift table referencing screws 36, on the front face thereof.

Each cooling plate, structurally illustrated by the lower plate 32, FIG. 4, has a planar mold support surface 37, locator holes 38 therethrough, downstream clamp bar slots 40 in parallel therethrough, in-parallel clamp stud guide channels 42 that are each open and have a plurality of clamp stud holes 44 spaced along the length thereof.

FIG. 5 illustrates securing and alignment means at the thermoforming station. Referring thereto, a conventional oven end clamp bar 46 is shown for clamping a worksheet to be thermoformed and a known type of tool locator means 48 that is reciprocal through a cooling plate locator holes 38 and operatively associates with the lower mold half at recess 50.

Also disclosed in FIG. 5 is a fluid-actuated downstream clamp bar means 52 extending through cooling plate slot 40 and in operative association with an edge face of the mold. Downstream clamp bars are conventional in thermoforming and are used to secure the worksheet while it is being molded. The section of the downstream clamp bar which projects above the support surface 37 is removed during the change of the mold. The fluid actuation of the clamping means of the present invention can be performed pneumatically or hydraulically. The downstream clamp means of the present invention is unique in that it can be adjustably translated along said slot in a rapid, convenient manner. Means enabling such adjustment is provided by a pair of laterally disposed flanges 54 that extend from respective opposed sides of the housing of the downstream clamp bar means and slidingly ride on respective ones of spaced, fixed L-shaped rails 56, 58 which underlie at least the extent of the slots. The flanges can be biased to the rails or the rails can be configured as open-ended slots. To translate the clamp bar, the housing is threadedly engaged to a threaded adjustment rod 60 that at one end is rotatably fixed in journal housing 62 and at its other end 64 extends outwardly of the apparatus to allow for manipulation thereof. A locking nut 66 secures the adjustment.

FIGS. 6 and 7, substantially fully disclose the structure of a hydraulically actuated quick-release-and-clamp means 68, which operatively associate with tool clamp studs 22. Piston 70 of cylinder 71 is shown in FIG. 7 to be biased downwardly by spring 72 so as to normally retain T-slot clamp 74 in clamping position with respect tool stud 22. Although shown in a "T" shape, the stud and the corresponding slots and clamp slots can be any convenient shape whereby the stud is securely fastened within the clamp slot when the clamp is locked. The expression "T-slot" includes any such convenient shape. The clamp is carried on the distal end of piston rod 76 and extends into stud clamp hole 44 of the cooling plate. To release the clamp, fluid feed into the cap end section of the cylinder exerts pressure on the piston whereby to compress spring 72 and effect release movement of the T-slot clamp (FIG. 6); fluid feed lines are not shown but are conventionally used in other parts of the thermoformer so feed lines for the clamping means can be added and arranged in any convenient manner.

It is noted that the clamp is normally retained in its functional position by a mechanical force, as distinguished from a fluid force thereby minimizing the hazards of clamp failure during a high speed operation such as a continuous molding operation.

As is well known in the art, all of the above-described movements can be automated and in-line.

To summarize, to effect a quick-change of a mold:

(1) the downstream clamp bar means is moved away from the edge of the mold, the removable upper sections of the downstream clamp bars are removed, the T-slot clamps are released, and the locator tools are retracted;

(2) the mold member is removed along the stud guide channels and onto the lift table that has been referenced to the lower platen; and (3) a fresh mold member, transferred from the again referenced lift table, is located and locked in place by the reverse of the corresponding steps of (1) and (2).

The embodiment shown and described is only illustrative of the present invention and is not to be construed as being delimitive thereof; since once being apprised of the invention, changes in structure would be readily apparent to one skilled in the art. Hence, the present invention includes all modifications encompassed within the spirit and scope of the following claims.

What is claimed is:

1. In combination in a work station having means to guide, locate and fix in place a member or fixture, whereby to facilitate rapid insertion, withdrawal and exchange thereof, comprising:

A. support means having a generally planar support surface;
   B. at least one channel in said surface, extending from an edge thereof and intersected by a plurality of holes that are spaced along the channel and extend through the support and channel;
   C. power-operated clamp means, disposed generally internally of the support means, which have rod elements that are reciprocable in respective ones of said intersecting hole and channel sections and carry at each of their distal ends a T-slot clamp located within the associated section;
   D. mechanical means within the T-slot clamp's power system which normally bias the clamps to clamping position within said associated sections, thereby minimizing the hazards of clamping failure during operations at the work station;
   E. means within said T-slot clamp power means for offsetting said bias means whereby a said member or fixture can be guidedly inserted or withdrawn from said channel and clamp slots; and
   F. means for removing said bias offsetting means thereby permitting the bias means to be operative and the T-slot clamps to return to clamping positions.

2. The combination of structure and means as in claim 1 which further comprises a fixture having tool clamp studs extending outwardly therefrom and said studs comprise the structure that is said to be guidedly inserted or withdrawn from said channel and clamp slots and said studs are configured to operatively associate with said T-slot clamps.

3. The combination of structure and means as in claim 2 wherein the station is a molding station, the fixture is a mold and said support means further comprises:

G. at least one cooling plate to which the mold is secured or released and inserted or withdrawn;
   H. said cooling plate being attached to a platen;
   I. said at least one channel being disposed in the cooling plate; and
   J. said plurality of spaced holes extending through the platen and cooling plate.

4. The combination of structure and means as in claim 3 wherein the molding station is a thermoforming station and the mold is a split mold, each of which mold parts is supported and adapted for handling, and at least one of the platens is movably mounted whereby to open and close the mold during processing.

5. The combination of structure and means as in claim 2 further comprising:

K. at least one slot extending through said support means, the slot underlying, and in direction normal to, an associated edge face of the fixture;
   L. a fluid-actuated downstream clamp bar means that is extensibly supported on an adjustable mounting disposed internally of the support surface, the bar being extendable through said slot for operative movement relative to said edge face;
   M. the adjustable mounting comprising:
      (a) opposed flanges extending outwardly of a housing of the mounting and in direction normal to said slot and housing, and slidable on respective opposed fixed rails disposed in parallel with said slot;
      (b) a threaded rod threadedly engaged with the housing, the rod being journalled at one end within the support means and having its other end manipulable and external of said support means;
      (c) whereby by manipulation of the threaded rod, the downstream clamp bar can be translated along said slot to accommodate different fixture sizes.

6. The combination of structure and means as in claim 5 wherein the station is a molding station, the fixture is a mold and said support means further comprises:

N. at least one cooling plate to which the mold is secured or released and inserted or withdrawn;
   O. said cooling plate being attached to a platen;
   P. said at least one channel being disposed in the cooling plate; and
   Q. said plurality of spaced holes and said slot each extend through said platen and cooling plate.

7. The combination of structure and means as in claim 6 wherein the molding station is a thermoforming station and the mold is a split mold, each of which mold parts is supported and adapted for handling, and at least one of the platens is movably mounted whereby to open and close the mold during processing.

8. In combination in a high-production molding station having means to guide, locate and fix in place a mold whereby to facilitate rapid insertion, withdrawal and exchange thereof, comprising:

A. at least one cooling plate to which the mold is secured or released and inserted or withdrawn;
   B. at least one channel in said cooling plate, extending from an edge thereof and intersected by a plurality of holes that are spaced along the channel and extend through the cooling plate and channel, said plurality of spaced holes extending through the cooling plate.
   C. power-operated clamp means, disposed generally internally of the cooling plate, which have rod elements that are reciprocable in respective ones of said intersecting hole and channel sections and carry at each of their distal ends a T-slot clamp located within the associated section;
   D. mechanical means within the T-slot clamp's power system normally bias the clamps to position within said associated sections, thereby minimizing the hazards of clamping failure during molding operations;
   E. means within said T-slot clamp power means for offsetting said bias means whereby a said mold can be guidedly inserted or withdrawn from said channel and clamp slots; and
   F. means for removing said bias offsetting means thereby permitting the bias means to be operative and the T-slot clamps to return to clamping positions.

9. The combination of structure and means as in claim 8 further comprising:

G at least one slot extending through said cooling plate, the slot underlying, and in direction normal to, an associated edge face of the mold;

H. a fluid-actuated downstream clamp bar means that is extensibly supported on an adjustable mounting disposed internally of the cooling plate, the bar being extendable through said slot for operative movement relative to said edge face;

I. the adjustable mounting comprising:
 (a) opposed flanges extending outwardly of a housing of the mounting and in direction normal to said slot and housing, and slidable on respective opposed fixed rails disposed in parallel with said slot;
 (b) a threaded rod threadedly engaged with the housing, the rod being journalled at one end within the cooling plate and having its other end manipulable and external of said cooling plate;
 (c) whereby by manipulation of the threaded rod, the downstream clamp bar can be translated along said slot to accommodate different fixture sizes.

10. The combination of structure and means as in claim 9 wherein:
 J. said cooling plate is attached to a platen;
 K. said at least one channel being disposed in the cooling plate; and
 L. said plurality of spaced holes and said slot each extend through said platen and cooling plate.

11. The combination of structure and means as in claim 10 wherein the molding station is a thermoforming station and further comprises a split mold, each of which mold parts is supported and adapted for handling in said station, and at least one of the platens is movably mounted whereby to open and close said mold during processing.

* * * * *